(12) United States Patent
Choi et al.

(10) Patent No.: US 12,051,779 B2
(45) Date of Patent: Jul. 30, 2024

(54) ELECTROLYTE FOR RECHARGEABLE LITHIUM BATTERY AND RECHARGEABLE LITHIUM BATTERY

(71) Applicant: SAMSUNG SDI CO., LTD., Yongin-si (KR)

(72) Inventors: Hyunbong Choi, Yongin-si (KR); Myunghoon Kim, Yongin-si (KR); Sanghoon Kim, Yongin-si (KR); Yunhee Kim, Yongin-si (KR); Injun Park, Yongin-si (KR); Hongryeol Park, Yongin-si (KR); Jeongmin Shin, Yongin-si (KR); Seungryong Oh, Yongin-si (KR); Myunghwan Jeong, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 228 days.

(21) Appl. No.: 17/538,800

(22) Filed: Nov. 30, 2021

(65) Prior Publication Data

US 2022/0173439 A1 Jun. 2, 2022

(30) Foreign Application Priority Data

Dec. 1, 2020 (KR) .................. 10-2020-0165879

(51) Int. Cl.
*H01M 10/0569* (2010.01)
*H01M 10/0525* (2010.01)
*H01M 10/0565* (2010.01)

(52) U.S. Cl.
CPC ... *H01M 10/0569* (2013.01); *H01M 10/0525* (2013.01); *H01M 10/0565* (2013.01)

(58) Field of Classification Search
CPC ......... H01M 10/0569; H01M 10/0525; H01M 10/0565

(Continued)

(56) References Cited

U.S. PATENT DOCUMENTS

2020/0153045 A1  5/2020  Choi et al.
2020/0388883 A1  12/2020  Cho et al.

FOREIGN PATENT DOCUMENTS

EP        3657589 A1     5/2020
KR  10-2017-0018739 A    2/2017

(Continued)

OTHER PUBLICATIONS

Machine Translation of KR 20190127412 A. Sep. 29, 2023.*

(Continued)

*Primary Examiner* — James M Erwin
*Assistant Examiner* — Kevin Nguyen
(74) *Attorney, Agent, or Firm* — Lewis Roca Rothgerber Christie LLP

(57) ABSTRACT

An electrolyte for a rechargeable lithium battery includes a non-aqueous organic solvent, a lithium salt, and an additive, wherein the additive includes a compound represented by Chemical Formula 1 and a compound represented by Chemical Formula 2:

Chemical Formula 1

(Continued)

-continued

Chemical Formula 2

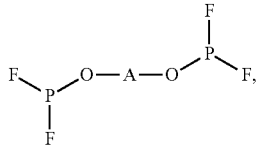

wherein X is a fluoro group, a chloro group, a bromo group, or an iodo group, and A is a C1 to C10 alkylene group or $(-C_2H_4-O-C_2H_4-)_m$, wherein m is an integer of 1 to 10.

16 Claims, 1 Drawing Sheet

(58) Field of Classification Search
USPC .......................................................... 429/325
See application file for complete search history.

(56) References Cited

FOREIGN PATENT DOCUMENTS

| KR | 10-2019-0123136 A | 10/2019 | |
|----|-------------------|---------|---|
| KR | 10-2019-0123137 A | 10/2019 | |
| KR | 10-2019-0127412 A | 11/2019 | |
| KR | 20190127412 A * | 11/2019 | ........ H01M 10/0567 |
| WO | WO 2019/017567 A1 | 1/2019 | |
| WO | WO-2019017567 A1 * | 1/2019 | ................ C07F 9/06 |
| WO | WO 2019-164164 A1 | 8/2019 | |

OTHER PUBLICATIONS

Extended European Search Report dated Apr. 7, 2022, of the corresponding European Patent Application No. 21210976.3 (7 pages).

Chinese Office Action dated Feb. 27, 2024, including Search Report dated Feb. 22, 2024, for corresponding Application No. 202111453866.4, including English translation, 11 pages.

* cited by examiner

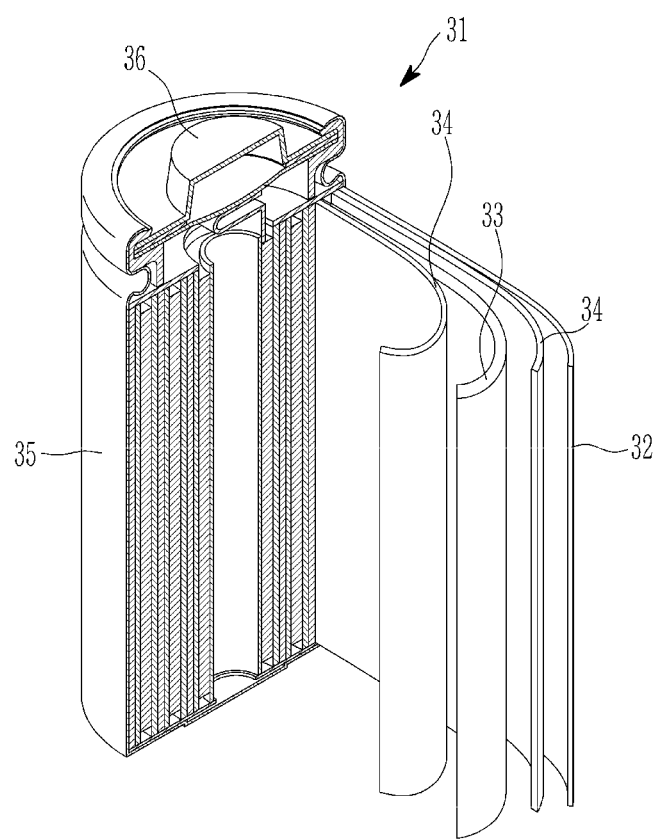

ELECTROLYTE FOR RECHARGEABLE LITHIUM BATTERY AND RECHARGEABLE LITHIUM BATTERY

CROSS-REFERENCE TO RELATED APPLICATION

This application claims priority to and the benefit of Korean Patent Application No. 10-2020-0165879 filed in the Korean Intellectual Property Office on Dec. 1, 2020, the entire content of which is incorporated herein by reference.

BACKGROUND

1. Field

One or more aspects of embodiments of the present disclosure relate to an electrolyte for a rechargeable lithium battery and a rechargeable lithium battery including the same.

2. Description of the Related Art

A rechargeable lithium battery may be recharged, and may have a high energy density per unit weight of three or more times that of a lead storage battery, nickel-cadmium battery, nickel hydrogen battery, nickel zinc battery and/or the like. It may be also charged at a high rate and thus, is commercially suitable for a laptop, a cell phone, an electric tool, an electric bike, and/or the like, and research on improving additional energy density is ongoing.

An example rechargeable lithium battery is manufactured by injecting an electrolyte into a battery cell, which includes a positive electrode including a positive active material capable of intercalating/deintercalating lithium ions, and a negative electrode including a negative active material capable of intercalating/deintercalating lithium ions.

The electrolyte includes an organic solvent in which a lithium salt is dissolved, and may critically determine the stability and performance of a rechargeable lithium battery. $LiPF_6$ is the most commonly utilized lithium salt in an electrolyte, but has a problematic tendency to react with an electrolytic solvent, resulting in solvent depletion and generation of a large amount of gas. When $LiPF_6$ is decomposed, it generates LiF and $PF_5$, which leads to electrolyte depletion in the battery, resulting in degraded high temperature performance and/or poor safety.

There are needs for an electrolyte that suppresses or reduces side reactions of such a lithium salt and improves the performance of the battery.

SUMMARY

One or more aspects of embodiments of the present disclosure are directed toward an electrolyte for a rechargeable lithium battery that suppresses an increase in resistance during high-temperature storage and improves battery performance by reducing gas generation.

One or more aspects of embodiments of the present disclosure are directed toward a rechargeable lithium battery including the electrolyte for a rechargeable lithium battery.

One or more embodiments of the present disclosure provide an electrolyte for a rechargeable lithium battery including a non-aqueous organic solvent, a lithium salt, and an additive, wherein the additive includes a compound represented by Chemical Formula 1 and a compound represented by Chemical Formula 2.

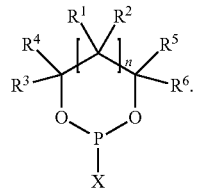

Chemical Formula 1

In Chemical Formula 1,
X may be a fluoro group, a chloro group, a bromo group, or an iodo group,
$R^1$ to $R^6$ may each independently be hydrogen, a cyano group, a substituted or unsubstituted C1 to C20 alkyl group, a substituted or unsubstituted C1 to C20 alkoxy group, a substituted or unsubstituted C2 to C20 alkenyl group, a substituted or unsubstituted C2 to C20 alkynyl group, a substituted or unsubstituted C3 to C20 cycloalkyl group, a substituted or unsubstituted C6 to C20 aryl group, or a substituted or unsubstituted C2 to C20 heteroaryl group, and
n may be an integer of 0 or 1,

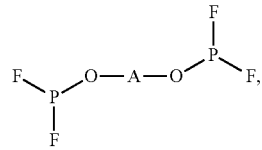

Chemical Formula 2 wherein, in Chemical Formula 2,
A may be a C1 to C10 alkylene group, or (—$C_2H_4$—O—$C_2H_4$—)$_m$, wherein m may be an integer of 1 to 10. In some embodiments, A may be a C1 to C3 alkylene group.

The compound represented by Chemical Formula 1 may be represented by Chemical Formula 1-1 or Chemical Formula 1-2:

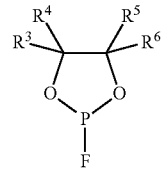

Chemical Formula 1-1

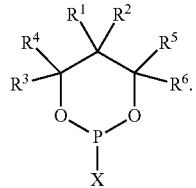

Chemical Formula 1-2

In Chemical Formulae 1-1 and 1-2,
$R^1$ to $R^6$ may each independently be hydrogen, a substituted or unsubstituted C1 to C10 alkyl group, a substituted or unsubstituted C1 to C10 alkoxy group, a substituted or unsubstituted C2 to C10 alkenyl group, or a substituted or unsubstituted C2 to C10 alkynyl group. In some embodiments, each of $R^1$ to $R^6$ may be hydrogen.

The compound represented by Chemical Formula 1 may be 2-fluoro-1,3,2-dioxaphospholane.

The compound represented by Chemical Formula 2 may be represented by Chemical Formula 2-1:

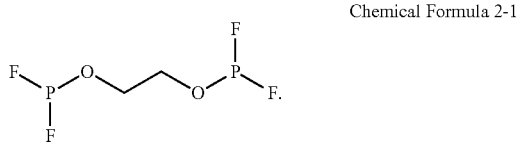

Chemical Formula 2-1

A weight ratio of the compound represented by Chemical Formula 1 to the compound represented by Chemical Formula 2 may be about 1:1 to about 3:1.

The weight ratio of the compound represented by Chemical Formula 1 to the compound represented by Chemical Formula 2 may be about 1:1 to about 2:1.

The compound represented by Chemical Formula 1 may be included in an amount of about 0.05 wt % to about 3 wt % based on 100 wt % of the non-aqueous organic solvent.

The compound represented by Chemical Formula 2 may be included in an amount of about 0.05 wt % to about 3 wt % based on 100 wt % of the non-aqueous organic solvent.

One or more embodiments of the present disclosure provide a rechargeable lithium battery including a positive electrode; a negative electrode; and the electrolyte.

The rechargeable lithium battery having excellent or suitable high-temperature storage characteristics may be implemented by suppressing an increase in resistance during high-temperature storage and reducing gas generation.

BRIEF DESCRIPTION OF THE DRAWING

The drawing is an exploded perspective view of a rechargeable lithium battery according to an embodiment.

DETAILED DESCRIPTION

Hereinafter, embodiments are described in more detail. However, these embodiments are examples, the present disclosure is not limited thereto and the present disclosure is defined by the scope of the claims.

It will be understood that, although the terms first, second, etc. may be used herein to describe various elements, these elements should not be limited by these terms. These terms are only used to distinguish one element from another element. Thus, a first element could be termed a second element without departing from the teachings of the present invention. Similarly, a second element could be termed a first element.

As used herein, singular forms such as "a," "an," and "the" are intended to include the plural forms as well, unless the context clearly indicates otherwise. It will be further understood that the terms "includes," "including," "comprises," and/or "comprising," when used in this specification, specify the presence of stated features, steps, operations, elements, components, and/or groups, but do not preclude the presence or addition of one or more other features, steps, operations, elements, components, and/or groups. The terms "use," "using," and "used" may be considered synonymous with the terms "utilize," "utilizing," and "utilized," respectively.

Expressions such as "at least one of," "one of," and "selected from," when preceding a list of elements, modify the entire list of elements and do not modify the individual elements of the list. The term "and/or" includes any and all combinations of one or more of the associated listed items.

The term "may" will be understood to refer to "one or more embodiments," some of which include the described element and some of which exclude that element and/or include an alternate element. Similarly, alternative language such as "or" refers to "one or more embodiments," each including a corresponding listed item.

As used herein, when a definition is not otherwise provided, "substituted" refers to replacement of hydrogen of a compound by a substituent selected from a halogen atom (F, Br, Cl, or I), a hydroxy group, an alkoxy group, a nitro group, a cyano group, an amino group, an azido group, an amidino group, a hydrazino group, a hydrazono group, a carbonyl group, a carbamyl group, a thiol group, an ester group, a carboxyl group or a salt thereof, a sulfonic acid group or a salt thereof, a phosphoric acid group or a salt thereof, a C1 to C20 alkyl group, a C2 to C20 alkenyl group, a C2 to C20 alkynyl group, a C6 to C30 aryl group, a C7 to C30 arylalkyl group, a C1 to C4 alkoxy group, a C1 to C20 heteroalkyl group, a C3 to C20 heteroarylalkyl group, a C3 to C30 cycloalkyl group, a C3 to C15 cycloalkenyl group, a C6 to C15 cycloalkynyl group, a C2 to C20 heterocycloalkyl group, and a combination thereof.

As used herein, when a definition is not otherwise provided, "hetero" indicates that the group, moiety, etc. includes 1 to 3 heteroatoms selected from nitrogen (N), oxygen (O), sulfur (S), and phosphorus (P).

Hereinafter, an electrolyte for a rechargeable lithium battery according to an embodiment is described.

An electrolyte for a rechargeable lithium battery according to an embodiment includes a non-aqueous organic solvent, a lithium salt, and an additive, wherein the additive includes a compound represented by Chemical Formula 1 and a compound represented by Chemical Formula 2.

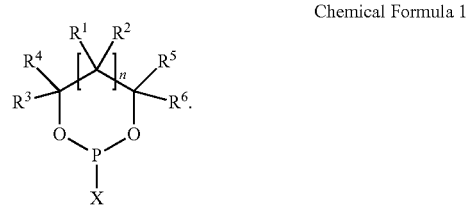

Chemical Formula 1

In Chemical Formula 1,

X is a fluoro group, a chloro group, a bromo group, or an iodo group, $R^1$ to $R^6$ may each independently be hydrogen, a cyano group, a substituted or unsubstituted C1 to C20 alkyl group, a substituted or unsubstituted C1 to C20 alkoxy group, a substituted or unsubstituted C2 to C20 alkenyl group, a substituted or unsubstituted C2 to C20 alkynyl group, a substituted or unsubstituted C3 to C20 cycloalkyl group, a substituted or unsubstituted C6 to C20 aryl group, or a substituted or unsubstituted C2 to C20 heteroaryl group, and n may be an integer of 0 or 1.

Chemical Formula 2

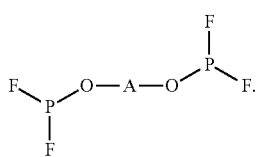

In Chemical Formula 2,

A may be a C1 to C10 alkylene group, or (—$C_2H_4$—O—$C_2H_4$—)$_m$, wherein m may be an integer of 1 to 10.

The compound represented by Chemical Formula 2 includes a difluorophosphite (—$OPF_2$) group having excellent or suitable electrical and chemical reactivity at the terminal end (e.g., two difluorophosphite groups, each at opposite ends).

The compound represented by Chemical Formula 1 serves to prevent or reduce hydrolysis by stabilizing the $LiPF_6$ salt in the electrolyte. For example, the compound represented by Chemical Formula 1 may be oxidized on the surface of a positive electrode to form a phosphate functional group (e.g., a compound including one or more phosphate functional groups), and the functional group may function as an anion receptor to stably form (e.g., stabilize) $PF_6^-$ and increase ion pair separation of $Li^+$ and $PF_6^-$, improving solubility of LiF in the electrolyte and reducing interfacial resistance.

In particular, the compound represented by Chemical Formula 1 has a lower oxidation potential than the solvent (e.g., an oxidation potential of the compound represented by Chemical Formula 1 is lower than an oxidation potential of the solvent) and thus forms an SEI film on the surface of a negative electrode before the electrolyte is decomposed, resultantly preventing or reducing oxidation of the electrolyte on the negative electrode.

In some embodiments, a product (i.e., phosphite) from the oxidation of the compound represented by Chemical Formula 1 on the positive electrode may be moved (e.g., diffused) to the negative electrode and may thus form an SEI film from reduction of the phosphite on the negative electrode, thereby suppressing or reducing a side reaction with the electrolyte.

In some embodiments, the compound represented by Chemical Formula 2 may form a stable SEI film having high heat resistance through a synergy effect with the phosphite functional group of the compound represented by Chemical Formula 1, so that the SEI film may remain still firm (e.g., may be stable) even when stored for a long time at a high temperature. As the SEI film is maintained, the SEI film may prevent or reduce exposure of the surface of the positive electrode and may thus more effectively suppress or reduce reactions on the interface of the positive electrode with the electrolyte, suppress or reduce high temperature-gas generation due to the stable film at a high temperature, and also suppress or reduce decomposition of the solvent of the electrolyte, thereby improving the high temperature storage characteristics of a rechargeable lithium battery.

Resultantly, the compounds represented by Chemical Formulae 1 and 2 are utilized together to form the SEI film on the surface of the negative electrode or a protective layer on the surface of the positive electrode to improve thermal stability, thereby providing a rechargeable lithium battery with excellent or suitable temperature stability and cycle-life characteristics.

In some embodiments, the compound represented by Chemical Formula 1 may be for example represented by Chemical Formula 1-1 or Chemical Formula 1-2.

Chemical Formula 1-1

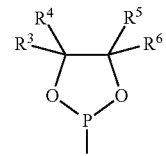

Chemical Formula 1-2

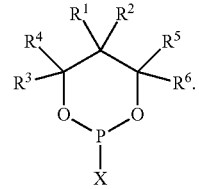

In Chemical Formulae 1-1 and 1-2, $R^1$ to $R^6$ may each independently be hydrogen, a substituted or unsubstituted C1 to C10 alkyl group, a substituted or unsubstituted C1 to C10 alkoxy group, a substituted or unsubstituted C2 to C10 alkenyl group, or a substituted or unsubstituted C2 to C10 alkynyl group.

In an embodiment, $R^1$ to $R^6$ may each independently be hydrogen or a substituted or unsubstituted C1 to C10 alkyl group, or $R^1$ to $R^6$ may each independently be hydrogen.

The compounds represented by Chemical Formulae 1-1 and 1-2 each have an electron-accepting fluorine substituent directly bonded to the central atom, phosphorus (P(III)), so that the stability of the SEI film present on the surface of the negative electrode may be further improved.

In an embodiment, the compound represented by Chemical Formula 1 may be 2-fluoro-1,3,2-dioxaphospholane.

The compound represented by Chemical Formula 2 may be represented by Chemical Formula 2-1:

Chemical Formula 2-1

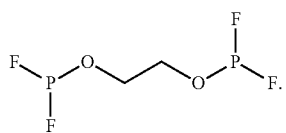

A weight ratio of the compound represented by Chemical Formula 1 and the compound represented by Chemical Formula 2 may be about 1:1 to about 3:1. When the compound represented by Chemical Formula 1 and the compound represented by Chemical Formula 2 are utilized within the above weight ratio range, stability during high temperature storage may be further improved.

For example, the weight ratio of the compound represented by Chemical Formula 1 to the compound represented by Chemical Formula 2 may be about 1:1 to about 3:1, about 1:1 to about 2.5:1, about 1:1 to about 2:1, about 1:1 to about 1.5:1, or about 1:1. For example, the compound represented by Chemical Formula 1 may be included in a greater amount than the compound represented by Chemical Formula 2 (e.g., an amount of the compound represented by Chemical Formula 1 is greater than an amount of the compound represented by Chemical Formula 2). For example, the weight ratio of the compound represented by Chemical Formula 1 to the compound represented by Chemical Formula 2 may be about 2:1.

The compound represented by Chemical Formula 1 may be included in an amount of about 0.05 wt % to about 3 wt %, for example about 0.3 wt % to about 5 wt %, about 0.5 wt % to about 3 wt %, about 0.5 wt % to about 1.5 wt %, about 0.5 wt % to about 1 wt %, or about 1 wt % to about 1.5 wt % based on 100 wt % of the non-aqueous organic solvent.

When the content (e.g., amount) range of the compound represented by Chemical Formula 1 is as described above, a high-temperature storage performance of the battery may be improved.

The compound represented by Chemical Formula 2 may be included in an amount of about 0.05 wt % to about 3 wt %, for example about 0.3 wt % to about 5 wt %, about 0.5 wt % to about 3 wt %, about 0.5 wt % to about 1.5 wt %, about 0.5 wt % to about 1 wt %, or about 1 wt % to about 1.5 wt % based on 100 wt % of the non-aqueous organic solvent.

When the content (e.g., amount) range of the compound represented by Chemical Formula 2 is as described above, the heat resistance of the film formed on the surface of the positive electrode may be improved.

The lithium salt is dissolved in an organic solvent, supplies a battery with lithium ions, basically operates the rechargeable lithium battery, and improves transportation of the lithium ions between positive and negative electrodes. Examples of the lithium salt may include at least one supporting salt selected from $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $Li(FSO_2)_2N$ (lithium bis(fluorosulfonyl)imide), LiFSI), $LiC_4F_9SO_3$, $LiClO_4$, $LiAlO_2$, $LiAlCl_4$, $LiPO_2F_2$, $LiN(C_xF_{2x+1}SO_2)(C_yF_{2y+1}SO_2)$ (wherein x and y are natural numbers, for example an integer of 1 to 20), lithium difluorobis(oxolato) phosphate, LiCl, LiI, $LiB(C_2O_4)_2$ (lithium bis(oxalato) borate), LiBOB), and lithium difluoro(oxalato) borate (LiDFOB). The lithium salt may be utilized in a concentration in a range of about 0.1 M to about 2.0 M. When the lithium salt is included at the above concentration range, an electrolyte may have excellent or suitable performance and/or lithium ion mobility due to optimal or suitable electrolyte conductivity and/or viscosity.

The non-aqueous organic solvent serves as a medium for transmitting ions taking part in the electrochemical reaction of a battery.

The non-aqueous organic solvent may include a carbonate-based, ester-based, ether-based, ketone-based, alcohol-based, and/or aprotic solvent.

For example, the non-aqueous organic solvent may be a mixed solvent including ethylene carbonate, ethyl methyl carbonate, dimethyl carbonate, methyl propyl carbonate, ethyl propyl carbonate, diethyl carbonate (DEC), dipropyl carbonate, propylene carbonate (PC), ethylene carbonate (EC), fluoroethylene carbonate (FEC), butylene carbonate, ethylpropionate, ethyl butyrate, acetonitrile, succinonitrile (SN), dimethyl sulfoxide, dimethyl formamide, dimethyl acetamide, gamma-valerolactone, gamma-butyrolactone tetrahydrofuran, or any combination thereof.

When a mixture of the organic solvents is utilized, the mixing ratio may be appropriately adjusted according to desired or suitable battery performance, which can be widely understood by those skilled in the art.

Another embodiment provides a rechargeable lithium battery including a positive electrode; a negative electrode; and the aforementioned electrolyte.

The positive electrode may include a current collector and a positive active material layer including a positive active material, which is formed on the current collector.

The positive active material may include lithiated intercalation compounds that reversibly intercalate and deintercalate lithium ions.

For example, at least one composite oxide of lithium and a metal selected from cobalt, manganese, nickel, aluminum, and combinations thereof may be utilized.

Non-limiting examples thereof may include compounds represented by of the following chemical formulae:

$Li_aA_{1-b}X_bD_2$ ($0.90 \le a \le 1.8$, $0 \le b \le 0.5$); $Li_aA_{1-b}X_bO_{2-c}D_c$ ($0.90 \le a \le 1.8$, $0 \le b \le 0.5$, $0 \le c \le 0.05$); $Li_aE_{1-b}X_bO_{2-c}D_c$ ($0.90 \le a \le 1.8$, $0 \le b \le 0.5$, $0 \le c \le 0.05$); $Li_aE_{2-b}X_bO_{4-c}D_c$ ($0.90 \le a \le 1.8$, $0 \le b \le 0.5$, $0 \le c \le 0.05$); $Li_aNi_{1-b-c}Co_bX_cD_\alpha$ ($0.90 \le a \le 1.8$, $0 \le b \le 0.5$, $0 \le c \le 0.5$, $0 < \alpha \le 2$); $Li_aNi_{1-b-c}Co_bX_cO_{2-\alpha}T_\alpha$ ($0.90 \le a \le 1.8$, $0 \le b \le 0.5$, $0 \le c \le 0.05$, $0 < \alpha < 2$); $Li_aNi_{1-b-c}Co_bX_cO_{2-\alpha}T_2$ ($0.90 \le a \le 1.8$, $0 \le b \le 0.5$, $0 \le c \le 0.05$, $0 < \alpha < 2$); $Li_aNi_{1-b-c}Mn_bX_cD_\alpha$ ($0.90 \le a \le 1.8$, $0 \le b \le 0.5$, $0 \le c \le 0.05$, $0 < \alpha \le 2$); $Li_aNi_{1-b-c}Mn_bX_cO_{2-\alpha}T_\alpha$ ($0.90 \le a \le 1.8$, $0 \le b \le 0.5$, $0 \le c \le 0.05$, $0 < \alpha < 2$); $Li_aNi_{1-b-c}Mn_bX_cO_{2-\alpha}T_2$ ($0.90 \le a \le 1.8$, $0 \le b \le 0.5$, $0 \le c \le 0.05$, $0 < \alpha < 2$); $Li_aNi_bE_cG_dO_2$ ($0.90 \le a \le 1.8$, $0 \le b \le 0.9$, $0 \le c \le 0.5$, $0.001 \le d \le 0.1$); $Li_aNi_bCo_cMn_dG_eO_2$ ($0.90 \le a \le 1.8$, $0 \le b \le 0.9$, $0 \le c \le 0.5$, $0 \le d \le 0.5$, $0.001 \le e \le 0.1$); $Li_aNiG_bO_2$ ($0.90 \le a \le 1.8$, $0.001 \le b \le 0.1$); $Li_aCoG_bO_2$ ($0.90 \le a \le 1.8$, $0.001 \le b \le 0.1$); $Li_aMn_{1-b}G_bO_2$ ($0.90 \le a \le 1.8$, $0.001 \le b \le 0.1$); $Li_aMn_2G_bO_4$ ($0.90 \le a \le 1.8$, $0.001 \le b \le 0.1$); $Li_aMn_{1-g}G_gPO_4$ ($0.90 \le a \le 1.8$, $0 \le g \le 0.5$); $QO_2$; $QS_2$; $LiQS_2$; $V_2O_5$; $LiV_2O_5$; $LiZO_2$; $LiNiVO_4$; $Li_{(3-f)}J_2(PO_4)_3$ ($0 \le f \le 2$); $Li_{(3-f)}Fe_2(PO_4)_3$ ($0 \le f \le 2$); $Li_aFePO_4$ ($0.90 \le a \le 1.8$)

In the chemical formulae above, A may be selected from Ni, Co, Mn, and combinations thereof; X may be selected from Al, Ni, Co, Mn, Cr, Fe, Mg, Sr, V, a rare earth element, and combinations thereof; D may be selected from O, F, S, P, and combinations thereof; E may be selected from Co, Mn, and combinations thereof; T may be selected from F, S, P, and combinations thereof; G may be selected from Al, Cr, Mn, Fe, Mg, La, Ce, Sr, V, and combinations thereof; Q may be selected from Ti, Mo, Mn, and combinations thereof; Z may be selected from Cr, V, Fe, Sc, Y, and combinations thereof; and J may be selected from V, Cr, Mn, Co, Ni, Cu, and combinations thereof.

The positive active material may include the positive active material with the coating layer, or a mixture of the positive active material and the positive active material coated with the coating layer. The coating layer may include a coating element compound selected from an oxide or hydroxide of a coating element, an oxyhydroxide of a coating element, an oxycarbonate of a coating element, or a hydroxycarbonate of a coating element. The compound for the coating layer may be either amorphous or crystalline. The coating element included in the coating layer may be magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), zirconium (Zr), or a mixture thereof. The coating process may include any suitable process (e.g., spray coating, dipping, etc.) as long as it does not cause any side effects to the properties of the positive active material.

An amount of the positive active material may be about 90 wt % to about 98 wt % based on the total weight of the positive active material layer.

In an embodiment, the positive active material layer may include a binder and a conductive material. Herein, the amounts of the binder and conductive material may each independently be about 1 wt % to about 5 wt % based on the total weight of the positive active material layer.

The binder may improve the binding properties of positive active material particles with one another and with a current collector. Examples thereof may include (e.g., be) polyvinyl alcohol, carboxymethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and/or the like, but are not limited thereto.

The conductive material is included to improve electrode conductivity. Any electrically conductive material may be utilized as a conductive material unless it causes an unwanted chemical change. Examples of the conductive material may include a carbon-based material (such as natural graphite, artificial graphite, carbon black, acetylene black, ketjen black, a carbon fiber, and/or the like); a metal-based material of a metal powder or a metal fiber including copper, nickel, aluminum, silver, and/or the like; a conductive polymer (such as a polyphenylene derivative); or a mixture thereof.

The current collector may be an Al foil, but is not limited thereto.

The negative electrode includes a current collector and a negative active material layer formed on the current collector.

The negative active material may be a material that reversibly intercalates/deintercalates lithium ions, a lithium metal, a lithium metal alloy, a material capable of doping and dedoping lithium, or a transition metal oxide.

The material that reversibly intercalates/deintercalates lithium ions includes carbon materials. The carbon material may be any generally-utilized carbon-based negative active material in a rechargeable lithium ion battery. Examples of the carbon material include crystalline carbon, amorphous carbon, and a combination thereof. The crystalline carbon may be non-shaped, or sheet, flake, spherical, or fiber shaped natural graphite or artificial graphite. The amorphous carbon may be a soft carbon, a hard carbon, a mesophase pitch carbonized product, calcined coke, and/or the like.

The lithium metal alloy may include lithium and a metal selected from sodium (Na), potassium (K), rubidium (Rb), cesium (Cs), francium (Fr), beryllium (Be), magnesium (Mg), calcium (Ca), strontium (Sr), silicon (Si), antimony (Sb), lead (Pb), indium (In), zinc (Zn), barium (Ba), radium (Ra), germanium (Ge), aluminum (Al), and tin (Sn).

The material capable of doping and dedoping lithium may include Si, $SiO_x$ (0<x<2), a Si-Q alloy (wherein Q is selected from an alkali metal, an alkaline-earth metal, a Group 13 element, a Group 14 element excluding Si, a Group 15 element, a Group 16 element, a transition metal element, a rare earth element, and any combination thereof), Sn, $SnO_2$, a Sn—R alloy (wherein R is an alkali metal, an alkaline-earth metal, a Group 13 element, a Group 14 element excluding Sn, a Group 15 element, a Group 16 element, a transition metal element, a rare earth element, or any combination thereof, and/or the like. At least one of them may be mixed with $SiO_2$. The elements Q and R may be selected from magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), thallium (Tl), germanium (Ge), phosphorus (P), arsenic (As), antimony (Sb), bismuth (Bi), sulfur (S), selenium (Se), tellurium (Te), polonium (Po), and combinations thereof.

The transition metal oxide may be a vanadium oxide, a lithium vanadium oxide, and/or the like.

In the negative active material layer, the negative active material may be included in an amount of about 95 wt % to about 99 wt % based on the total weight of the negative active material layer.

In an embodiment, the negative active material layer may include a binder, and optionally a conductive material. In the negative active material layer, the amount of the binder may be about 1 wt % to about 5 wt % based on the total weight of the negative active material layer. When the negative active material layer further includes the conductive material, it may include about 90 wt % to about 98 wt % of the negative active material, about 1 wt % to about 5 wt % of the binder, and about 1 wt % to about 5 wt % of the conductive material.

The binder may improve the binding properties of negative active material particles with one another and with a current collector. The binder may be a non-water-soluble binder, a water-soluble binder, or any combination thereof.

The non-water-soluble binder may be polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, polyamideimide, polyimide, or any combination thereof.

The water-soluble binder may be a rubber-based binder or a polymer resin binder. The rubber-based binder may be selected from a styrene-butadiene rubber, an acrylated styrene-butadiene rubber (SBR), an acrylonitrile-butadiene rubber, an acrylic rubber, a butyl rubber, a fluorine rubber, and combinations thereof. The polymer resin binder may be selected from polytetrafluoroethylene, polyethylene, polypropylene, ethylene propylene copolymer, polyethylene oxide, polyvinylpyrrolidone, polyepichlorohydrin, polyphosphazene, polyacrylonitrile, polystyrene, an ethylene propylene diene copolymer, polyvinylpyridine, chlorosulfonated polyethylene, latex, a polyester resin, an acrylic resin, a phenolic resin, an epoxy resin, polyvinyl alcohol, and combinations thereof.

When the water-soluble binder is utilized as the negative electrode binder, a cellulose-based compound may be further utilized to provide viscosity, e.g., as a thickener. The cellulose-based compound may include one or more selected from carboxymethyl cellulose, hydroxypropylmethyl cellulose, methyl cellulose, and alkali metal salts thereof. The alkali metal may be Na, K, or Li. Such a thickener may be included in an amount of about 0.1 to about 3 parts by weight based on 100 parts by weight of the negative active material.

The conductive material is included to provide electrode conductivity. Any electrically conductive material may be utilized as a conductive material unless it causes a chemical change. Examples thereof may be a carbon-based material (such as natural graphite, artificial graphite, carbon black, acetylene black, ketjen black, carbon fiber and/or the like); a metal-based material (such as a metal powder or a metal fiber and/or the like of copper, nickel, aluminum, silver, and/or the like); a conductive polymer (such as a polyphenylene derivative and/or the like), or a mixture thereof.

The current collector may be selected from a copper foil, a nickel foil, a stainless steel foil, a titanium foil, a nickel foam, a copper foam, a polymer substrate coated with a conductive metal, and combinations thereof.

The rechargeable lithium battery may further include a separator between the negative electrode and the positive electrode, depending on the type or kind of battery. Such a separator may be a porous substrate or a composite porous substrate.

The porous substrate may be a substrate including pores, and lithium ions may move through the pores. The porous substrate may for example include polyethylene, polypropylene, polyvinylidene fluoride, and multi-layers thereof (such as a polyethylene/polypropylene double-layered separator, a polyethylene/polypropylene/polyethylene triple-layered separator, and a polypropylene/polyethylene/polypropylene triple-layered separator).

The composite porous substrate may have a form including a porous substrate and a functional layer on the porous substrate. The functional layer may be, for example, at least one of a heat-resistant layer and an adhesive layer from the viewpoint of enabling additional function. For example, the heat-resistant layer may include a heat-resistant resin and optionally a filler.

In some embodiments, the adhesive layer may include an adhesive resin and optionally a filler.

The filler may be an organic filler or an inorganic filler.

The drawing is an exploded perspective view of a rechargeable lithium battery according to an embodiment. The rechargeable lithium battery according to an embodiment is illustrated as a cylindrical battery, but is not limited thereto and may have any suitable form or shape (such as a prismatic or pouch format).

Referring to the drawing, a rechargeable lithium battery 31 according to an embodiment includes a positive electrode 33 including the positive active material, a negative electrode 32, and a separator 34. The positive electrode 33 including the aforementioned positive active material, the negative electrode 32, and the separator 34 are wound or folded and accommodated in the battery case 35. Then, the organic electrolyte is injected into the battery case 35 and sealed utilizing the cap assembly 36 to complete the rechargeable lithium battery 31.

Hereinafter, examples of the present disclosure and comparative examples are described. These examples, however, are not in any sense to be interpreted as limiting the scope of the present disclosure.

Manufacture of Rechargeable Lithium Battery Cell

EXAMPLE 1

LiNi$_{0.8}$Co$_{0.15}$Al$_{0.05}$O$_2$ as a positive active material, polyvinylidene fluoride as a binder, and carbon black as a conductive material were mixed respectively in a weight ratio of 92:4:4 and then, dispersed in N-methyl pyrrolidone to prepare positive active material slurry.

The positive active material slurry was coated to be 15 μm thick on an Al foil, dried at 100° C., and pressed to manufacture a positive electrode.

Graphite as a negative active material, polyvinylidene fluoride as a binder, and ketjen black as a conductive material were mixed in a weight ratio of 98:1:1 and then, dispersed in N-methyl pyrrolidone to prepare negative active material slurry.

The negative active material slurry was coated on a 10 μm-thick Cu foil, dried at 100° C., and pressed to manufacture a negative electrode.

The manufactured positive and negative electrodes, a 25 μm-thick polyethylene separator, and an electrolyte solution were utilized to manufacture a rechargeable lithium battery cell. The electrolyte solution of the rechargeable lithium battery had the following composition.

Electrolyte Solution Composition

Salt: 1.15 M LiPF$_6$

Solvent: ethylene carbonate:ethyl methyl carbonate:dimethyl carbonate=2:1:7 (EC:EMC:DMC=volume ratio of 2:1:7)

Additive: 0.5 wt % of 2-fluoro-1,3,2-dioxaphospholane as the compound represented by Chemical Formula 1, and 0.5 wt % of the compound represented by Chemical Formula 2-1 as the compound represented by Chemical Formula 2

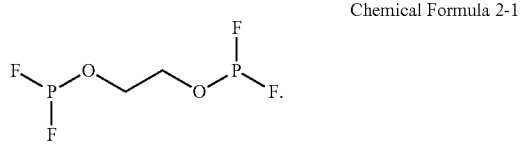

Chemical Formula 2-1

Herein, in the electrolyte composition, "wt %" is based on 100 wt % of solvent.

EXAMPLE 2

A rechargeable lithium battery cell was manufactured according to substantially the same method as Example 1 except that the content (e.g., amount) of the compound represented by Chemical Formula 1 was changed into 0.75 wt %.

EXAMPLE 3

A rechargeable lithium battery cell was manufactured according to substantially the same method as Example 1 except that the content (e.g., amount) of the compound represented by Chemical Formula 1 was changed into 1 wt %.

EXAMPLE 4

A rechargeable lithium battery cell was manufactured according to substantially the same method as Example 1 except that the content (e.g., amount) of the compound represented by Chemical Formula 1 was changed into 1.25 wt %.

COMPARATIVE EXAMPLE 1

A rechargeable lithium battery cell was manufactured according to substantially the same method as Example 1 except that the contents of the compound represented by Chemical Formula 1 and the compound represented by Chemical Formula 2 were respectively changed into 0 wt % and 0.5 wt %.

COMPARATIVE EXAMPLE 2

A rechargeable lithium battery cell was manufactured according to substantially the same method as Example 1 except that the contents of the compound represented by Chemical Formula 1 and the compound represented by Chemical Formula 2 were respectively changed into 0.5 wt % and 0 wt %.

COMPARATIVE EXAMPLE 3

A rechargeable lithium battery cell was manufactured according to substantially the same method as Example 1 except that the compound represented by Chemical Formula 3 was utilized instead of the compound represented by Chemical Formula 1, and the contents of the compound represented by Chemical Formula 3 and compound represented by Chemical Formula 2 were respectively changed into 0.5 wt % and 0.5 wt %:

Chemical Formula 3

COMPARATIVE EXAMPLE 4

A rechargeable lithium battery cell was manufactured according to substantially the same method as Example 1 except that both (e.g., simultaneously) the compound represented by Chemical Formula 1 and the compound represented by Chemical Formula 2 were not utilized.

Evaluation 1 of Battery Characteristics: Measurement of Resistance Increase Rate During High-Temperature Storage The rechargeable lithium battery cells according to Examples 1 to 4 and Comparative Examples 1 to 4 were allowed to stand in a charged state (SOC (state of charge) =100%) at 60° C. for 30 days and then, evaluated with respect to a direct current internal resistance (DC-IR) resistance increase rate after storage at a high temperature of 60° C., and the results are shown in Table 1.

The DC-IR resistance increase rate (%) after high-temperature storage is the DC-IR after standing for 30 days at a high temperature of 60° C., expressed as a percentage of the initial DC-IR.

including only one of the compounds represented by Chemical Formulae 1 and 2 (according to Comparative Examples 1 and 2), (b) an electrolyte including neither of the compounds represented by Chemical Formulae 1 and 2 (according to Comparative Example 4), or (c) an electrolyte including a compound represented by Chemical Formula 3 instead of the compound represented by Chemical Formula 1 (according to Comparative Example 3).

Evaluation 2 of Battery Characteristics: Gas Generation

The battery cells according to Example 2 and Comparative Examples 1 to 3 were allowed to stand at 60° C. for 30 days and then, measured with respect to gas generation amounts (mL) through a refinery gas analysis (RGA). The results are shown in Table 2.

TABLE 2

| | Gas generation amount (mL) after high-temperature (60° C.) storage | | |
|---|---|---|---|
| | 1 day | 3 days | 7 days |
| Example 2 | 0.023 | 0.032 | 0.038 |
| Comparative Example 1 | 0.026 | 0.04 | 0.055 |
| Comparative Example 2 | 0.024 | 0.045 | 0.056 |
| Comparative Example 3 | 0.022 | 0.041 | 0.078 |

Referring to Table 2, the rechargeable lithium battery cell utilizing an electrolyte including the compound represented by Chemical Formulae 1 and 2 in a weight ratio of 1:1 to 3:1 according to Example 2 exhibited a smaller gas generation amount after being stored at a high temperature than the rechargeable lithium battery cells utilizing: (a) an electrolyte including only one of the compounds represented by Chemical Formulae 1 and 2 (according to Comparative Examples 1 and 2), (b) an electrolyte including neither one of the compounds represented by Chemical Formulae 1 and 2 (according to Comparative Example 4), or (c) an electrolyte including a compound represented by Chemical Formula 3 instead of the compound represented by Chemical Formula 1 according to Comparative Example 3. Accordingly, when electrolytes according to the present examples were included, storage characteristics at a high temperature of a rechargeable lithium battery cell was improved.

TABLE 1

| | Additive amount (wt %) | | | Initial DC-IR (mΩ) | DC-IR after high temperature storage (mΩ) | DC-IR increase rate after high-temperature storage (%, 60° C., 30 days) |
|---|---|---|---|---|---|---|
| | Chemical Formula 1 | Chemical Formula 2 | Chemical Formula 3 | | | |
| Example 1 | 0.5 | 0.5 | 0 | 18.73 | 21.33 | 113.8 |
| Example 2 | 0.75 | 0.5 | 0 | 18.73 | 21.12 | 112.8 |
| Example 3 | 1 | 0.5 | 0 | 18.88 | 21.15 | 112.0 |
| Example 4 | 1.25 | 0.5 | 0 | 18.98 | 21.46 | 113.0 |
| Comparative Example 1 | 0 | 0.5 | 0 | 19.66 | 23.14 | 177.7 |
| Comparative Example 2 | 0.5 | 0 | 0 | 18.82 | 22.20 | 118 |
| Comparative Example 3 | 0 | 0.5 | 0.5 | 19.89 | 24.26 | 122 |
| Comparative Example 4 | 0 | 0 | 0 | 18.92 | 23.08 | 122 |

As shown in Table 1, the rechargeable lithium battery cells utilizing an electrolyte including the compounds represented by Chemical Formulae 1 and 2 in a weight ratio of 1:1 to 3:1 (according to Examples 1 to 4) each exhibited a low DC-IR resistance increase rate during the storage at a high temperature and thus excellent or suitable storage characteristics at the high temperature, compared with the rechargeable lithium battery cells utilizing: (a) an electrolyte Evaluation 3 of Battery Characteristics: Room Temperature Cycle-life The cells of Example 2 and Comparative Examples 1 to 4 were charged with a constant current-constant voltage (CC-CV) of 1 C to 4.45 V and cut off at 0.05 C and discharged down to 3.0 V at a constant current of 1.0 C at room temperature of 25° C., and then evaluated with respect to discharge capacity over 200 cycles. Capacity retention at each cycle relative to discharge capacity at the first cycle was calculated, and the results for the cells after 200 cycles are shown in Table 3.

TABLE 3

|   | Capacity retention (%) |
|---|---|
| Example 2 | 93.5 |
| Comparative Example 1 | 91.2 |
| Comparative Example 2 | 91.6 |
| Comparative Example 3 | 89.7 |
| Comparative Example 4 | 91.8 |

Referring to Table 3, the rechargeable lithium battery cell utilizing an electrolyte including the compounds represented by Chemical Formulae 1 and 2 in a weight ratio of 1:1 to 3:1 according to Example 2 exhibited excellent or suitable cycle-life characteristics, compared with the rechargeable lithium battery cells utilizing: (a) an electrolyte solution including only one of the compounds represented by Chemical Formulae 1 and 2 (according to Comparative Examples 1 and 2), (b) an electrolyte including neither one of the compounds represented by Chemical Formulae 1 and 2 (according to Comparative Example 4), or (c) an electrolyte including a compound represented by Chemical Formula 3 instead of the compound represented by Chemical Formula 1 (according to Comparative Example 3).

Terms such as "substantially," "about," and "~" are used as terms of approximation and not as terms of degree, and are intended to account for the inherent deviations in measured or calculated values that would be recognized by those of ordinary skill in the art. They may be inclusive of the stated value and an acceptable range of deviation as determined by one of ordinary skill in the art, considering the limitations and error associated with measurement of that quantity. For example, "about" may refer to one or more standard deviations, or ±30%, 20%, 10%, 5% of the stated value.

Numerical ranges disclosed herein include and are intended to disclose all subsumed sub-ranges of the same numerical precision. For example, a range of "1.0 to 10.0" includes all subranges having a minimum value equal to or greater than 1.0 and a maximum value equal to or less than 10.0, such as, for example, 2.4 to 7.6. Applicant therefore reserves the right to amend this specification, including the claims, to expressly recite any sub-range subsumed within the ranges expressly recited herein.

While this disclosure has been described in connection with what is presently considered to be practical example embodiments, it is to be understood that the present disclosure is not limited to the disclosed embodiments, but, on the contrary, is intended to cover one or more suitable modifications and equivalent arrangements included within the spirit and scope of the appended claims and equivalents thereof.

DESCRIPTION OF SOME OF THE SYMBOLS

31: rechargeable lithium battery
32: negative electrode
33: positive electrode
34: separator
35: battery case
36: cap assembly

What is claimed is:

1. An electrolyte for a rechargeable lithium battery, the electrolyte comprising:
   a non-aqueous organic solvent, a lithium salt, and an additive,
   wherein the additive comprises a compound represented by Chemical Formula 1 and a compound represented by Chemical Formula 2:

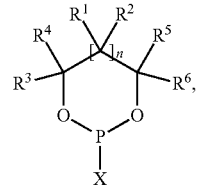

Chemical Formula 1 wherein, in Chemical Formula 1,
X is a fluoro group, a chloro group, a bromo group, or an iodo group,
$R^1$ to $R^6$ are each independently hydrogen, a cyano group, a substituted or unsubstituted C1 to C20 alkyl group, a substituted or unsubstituted C1 to C20 alkoxy group, a substituted or unsubstituted C2 to C20 alkenyl group, a substituted or unsubstituted C2 to C20 alkynyl group, a substituted or unsubstituted C3 to C20 cycloalkyl group, a substituted or unsubstituted C6 to C20 aryl group, or a substituted or unsubstituted C2 to C20 heteroaryl group, and
n is an integer of 0 or 1,

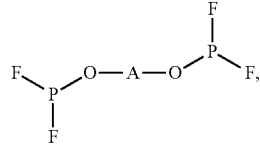

Chemical Formula 2 and
wherein, in Chemical Formula 2,
A is a C1 to C10 alkylene group or (—$C_2H_4$—O—$C_2H_4$—)$_m$, wherein m is an integer of 1 to 10.

2. The electrolyte of claim 1, wherein the compound represented by Chemical Formula 1 is represented by Chemical Formula 1-1 or Chemical Formula 1-2:

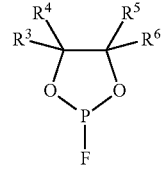

Chemical Formula 1-1

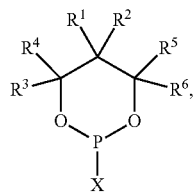

Chemical Formula 1-2 and wherein, in Chemical Formulae 1-1 and 1-2,

R¹ to R⁶ are each independently hydrogen, a substituted or unsubstituted C1 to C10 alkyl group, a substituted or unsubstituted C1 to C10 alkoxy group, a substituted or unsubstituted C2 to C10 alkenyl group, or a substituted or unsubstituted C2 to C10 alkynyl group.

3. The electrolyte of claim 1, wherein the compound represented by Chemical Formula 1 is 2-fluoro-1,3,2-dioxaphospholane.

4. The electrolyte of claim 1, wherein the compound represented by Chemical Formula 2 is represented by Chemical Formula 2-1:

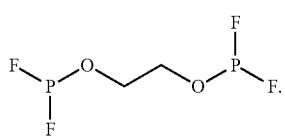

Chemical Formula 2-1

5. The electrolyte of claim 1, wherein a weight ratio of the compound represented by Chemical Formula 1 and the compound represented by Chemical Formula 2 is about 1:1 to about 3:1.

6. The electrolyte of claim 1, wherein a weight ratio of the compound represented by Chemical Formula 1 and the compound represented by Chemical Formula 2 is about 1:1 to about 2:1.

7. The electrolyte of claim 1, wherein the compound represented by Chemical Formula 1 is included in an amount of about 0.05 wt % to about 3 wt % based on 100 wt % of the non-aqueous organic solvent.

8. The electrolyte of claim 1, wherein the compound represented by Chemical Formula 2 is included in an amount of about 0.05 wt % to about 3 wt % based on 100 wt % of the non-aqueous organic solvent.

9. A rechargeable lithium battery comprising:

a positive electrode;

a negative electrode; and the electrolyte of claim 1.

10. The rechargeable lithium battery of claim 9, wherein the compound represented by Chemical Formula 1 is represented by Chemical Formula 1-1 or Chemical Formula 1-2:

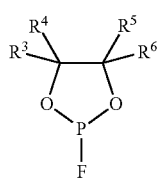

Chemical Formula 1-1 and

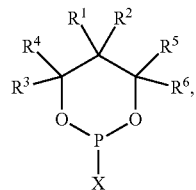

Chemical Formula 1-2 wherein, in Chemical Formulae 1-1 and 1-2,

R¹ to R⁶ are each independently hydrogen, a substituted or unsubstituted C1 to C10 alkyl group, a substituted or unsubstituted C1 to C10 alkoxy group, a substituted or unsubstituted C2 to C10 alkenyl group, or a substituted or unsubstituted C2 to C10 alkynyl group.

11. The rechargeable lithium battery of claim 9, wherein the compound represented by Chemical Formula 1 is 2-fluoro-1,3,2-dioxaphospholane.

12. The rechargeable lithium battery of claim 9, wherein the compound represented by Chemical Formula 2 is represented by Chemical Formula 2-1:

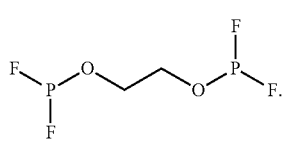

Chemical Formula 2-1

13. The rechargeable lithium battery of claim 9, wherein a weight ratio of the compound represented by Chemical Formula 1 and the compound represented by Chemical Formula 2 is about 1:1 to about 3:1.

14. The rechargeable lithium battery of claim 9, wherein a weight ratio of the compound represented by Chemical Formula 1 and the compound represented by Chemical Formula 2 is about 1:1 to about 2:1.

15. The rechargeable lithium battery of claim 9, wherein the compound represented by Chemical Formula 1 is included in an amount of about 0.05 wt % to about 3 wt % based on 100 wt % of the non-aqueous organic solvent.

16. The rechargeable lithium battery of claim 9, wherein the compound represented by Chemical Formula 2 is included in an amount of about 0.05 wt % to about 3 wt % based on 100 wt % of the non-aqueous organic solvent.

* * * * *

UNITED STATES PATENT AND TRADEMARK OFFICE
CERTIFICATE OF CORRECTION

| | | |
|---|---|---|
| PATENT NO. | : 12,051,779 B2 | Page 1 of 1 |
| APPLICATION NO. | : 17/538800 | |
| DATED | : July 30, 2024 | |
| INVENTOR(S) | : Hyunbong Choi et al. | |

It is certified that error appears in the above-identified patent and that said Letters Patent is hereby corrected as shown below:

In the Claims

In Column 16, Lines 58-67, in Claim 2, in Chemical Formula 1-2:

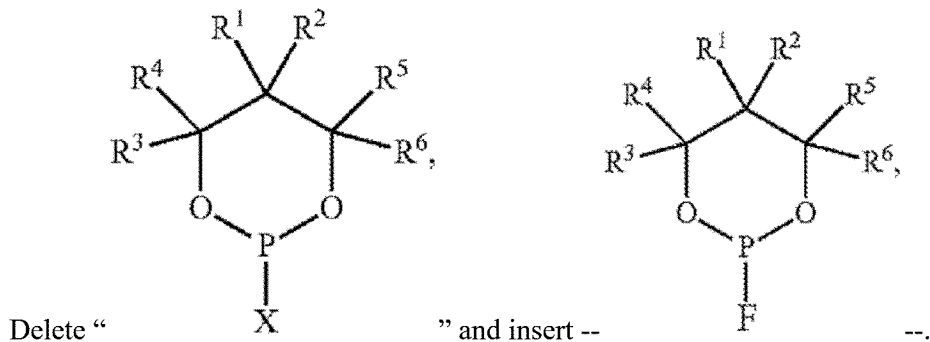

In Column 18, Lines 1-10, in Claim 10, in Chemical Formula 1-2:

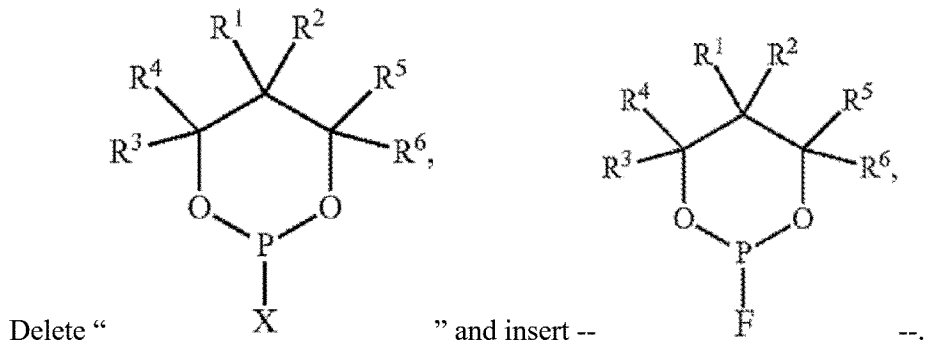

Signed and Sealed this
Seventeenth Day of December, 2024

Derrick Brent
*Acting Director of the United States Patent and Trademark Office*